United States Patent [19]

Nickle

[11] Patent Number: 5,072,899
[45] Date of Patent: Dec. 17, 1991

[54] KITE ACCESSORY RELEASE DEVICE WITH DISSOLVABLE MEMBER

[76] Inventor: Steven L. Nickle, 3390 S. 5475 W., West Valley City, Utah 84120

[21] Appl. No.: 700,612

[22] Filed: May 15, 1991

[51] Int. Cl.⁵ .......................................... B64C 31/06
[52] U.S. Cl. ............................ 244/155 R; 24/602; 403/2; 294/66.1; 294/82.33; 294/106
[58] Field of Search .......... 244/138 R, 151 A, 151 B, 244/155 R, 153 R; 403/2; 24/602; 294/66.1, 82.25, 82.33, 82.32, 106

[56] References Cited

U.S. PATENT DOCUMENTS

| 700,281 | 5/1902 | Wyatt | 244/155 R |
|---|---|---|---|
| 1,735,309 | 11/1929 | Albecht | 244/155 R |
| 2,464,720 | 3/1949 | Rose | 244/155 R |
| 2,575,157 | 11/1951 | Berthene | 244/155 R |
| 2,822,998 | 2/1958 | Toth | 244/155 R |
| 2,930,555 | 3/1960 | Larson | 244/155 R |
| 3,356,322 | 12/1967 | Rous | 244/155 R |
| 3,779,004 | 12/1973 | Gloeckler | 24/60 X |
| 3,873,051 | 3/1975 | Kennedy | 244/155 R |
| 3,884,518 | 5/1975 | Lepetit et al. | 294/82.33 |
| 4,014,880 | 3/1977 | Caradec | 24/602 |

*Primary Examiner*—Galen Barefoot
*Attorney, Agent, or Firm*—Stephen E. Clark

[57] ABSTRACT

Release device tied to underside of kite has rubber band-biased, cooperating jaws which releasably hold toy "paratrooper". Liquid-filled gelatin capsule serves as pin to hold jaws in closed position. Salt-water solution in capsule dissolves capsule, which causes jaws to open and "paratrooper" to be released from mechanism. Varying the concentration of the salt-water solution controls the amount of time delay before which the capsule dissolves and the "paratrooper" is released.

8 Claims, 7 Drawing Sheets

KITE ACCESSORY RELEASE DEVICE WITH DISSOLVABLE MEMBER

BACKGROUND OF THE INVENTION

1. Field of Invention

The present invention relates to kite accessories. In particular, the present invention relates to time-delayed release mechanisms by which toys are dropped from airborne kites.

1. Description of Related Art

Many devices are well known which allow a payload, such as a toy "paratrooper", to be supported beneath an airborne kite and then be subsequently dropped.

On many such prior devices, the "paratrooper" is provided with a hook (e.g. U.S. Pat. No. 700,281) or a grooved wheel (e.g. U.S. Pat. No. 2,930,555) which can be temporarily attached to the guy string of an already-airborne kite by the kite's operator.

In such prior devices, the "paratrooper's" hook (or wheel) typically rides up the kite's guy string due to the force of the same winds which support the kite. When the hook (or wheel) which is supporting the "paratrooper" reaches a discontinuity (such as a flat plate, or an open wire frame, etc.) along the kite's guy string, the "paratrooper" detaches from the string and falls to the ground.

A problem of such prior devices is that the kite typically has to be airborne before the "paratrooper" can be attached to the guy string.

Another problem of such prior devices is that they must rely on a low altitude wind to push the "paratrooper" up the kite's guy string.

Another problem of such prior devices is that as soon as the "paratrooper" gets to a pre-determined point along the kite string it (the "paratrooper") becomes detached and falls. Thus, if there is a high wind the "paratrooper" may be pushed up the kite string very quickly and subsequently be released in only a few seconds.

Another problem of such prior devices is that there is no reliable means to control the amount of time the "paratrooper" will remain attached to the kite/kite string before it is released.

Prior devices (e.g. U.S. Pat. No. 3,873,051) are known which comprise a time-delay release mechanism. In such prior devices the time delay mechanism typically consists of corresponding adhesive (or Velcro) components which simply fall apart, after a period of time, under their own weight. A problem of prior devices of this type is that it is difficult to control the amount of time before the release mechanism activates.

Another problem with such prior device is that over time, and after repeated use, the mating components wear down, causing the length of the time delay to change.

It is a still further problem of such prior devices that the length of the time delay is often dependent on the weight of the payload (i.e. the "paratrooper").

Another problem of prior devices of each of the above-mentioned types is that the "paratrooper" is usually loosely supported by the kite and cannot be securely attached to the kite (or the kite string) prior to its (the kite's) being flown.

SUMMARY OF THE INVENTION

Accordingly, it is a primary object of the present invention to provide a kite accessory device whereby a small payload (such as a "paratrooper" toy) can be dropped from an airborne kite.

It is another object of the present invention to provide a device of the character described in which the "paratrooper" can be securely attached beneath the kite before the kite becomes airborne.

It is another object of the present invention to provide a device of the character described in which the point at which the "paratrooper" is released is independent of the weight of the "paratrooper".

It is another object of the present invention to provide a device of the character described in which the point at which the "paratrooper" is released is independent of the number of times the device has been used.

It is another object of the present invention to provide a device of the character described in which the release of the "paratrooper" from the kite is time delayed.

It is another object of the present invention to provide a device of the character described in which the amount of time delay, before which the "paratrooper" is released, can be reliably controlled by the kite operator.

Further objects and advantages of my invention will become apparent from a consideration of the drawings and ensuing description thereof.

DESCRIPTION OF THE PREFERRED EMBODIMENT

Figure 5:
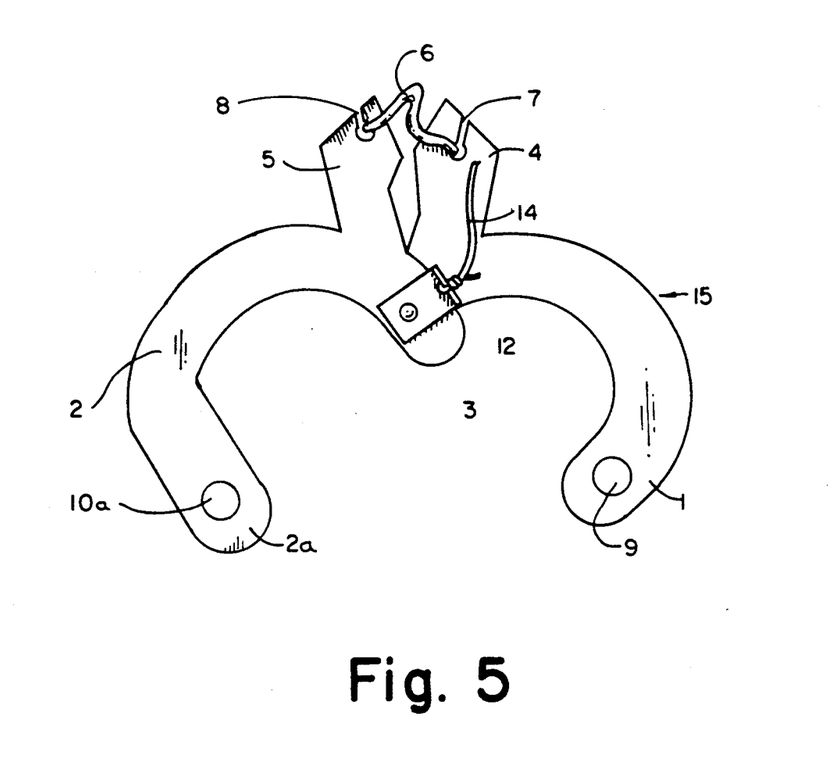
FIG. 5 is a front view showing the release mechanism in the "open" position.

In the preferred embodiment of the invention, cooperating jaws (1) and (2) are pivotally attached to each other by pin (3). The jaws (1) and (2) are preferably constructed of a rigid plastic material. The top of each jaw (1) and (2) is provided with an arm (4) and (5), respectively, which extends away from pin (3). A rubber band (6) is inserted into slots (7) and (8) which are provided in arms (4) and (5), respectively, as shown in FIG. 5. The rubber band (6) biases the ends of the two arms (4) and (5) toward each other, and the opposite ends of the jaws (1) and (2) away from each other.

Figure 4:
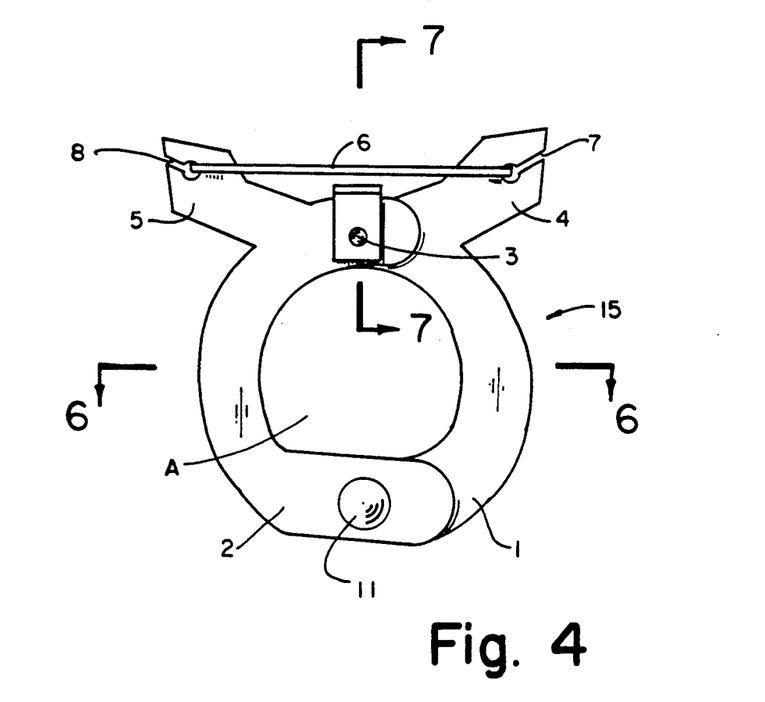
FIG. 4 is a front view showing the release mechanism in the "closed" position.

FIG. 4 shows the jaws (1) and (2) in the "closed" position. A locking pin hole (9) is located in jaw (1).

Figure 6:
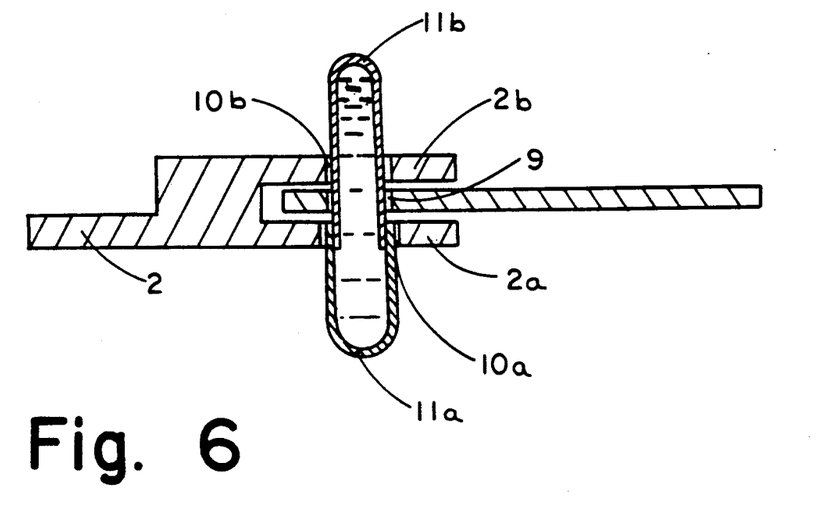
FIG. 6 is a cross-sectional view of the release mechanism taken along the line 6—6 of FIG. 4.
Figure 7:
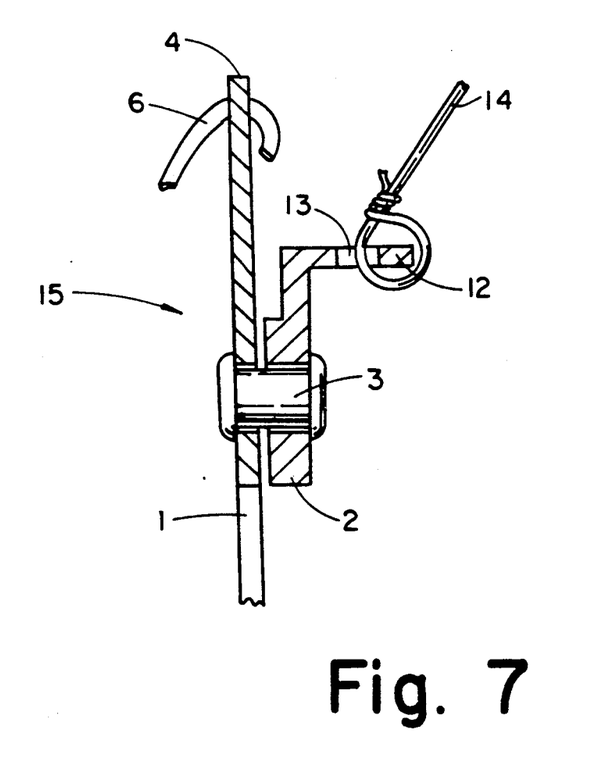
FIG. 7 is a cross-sectional view of the release mechanism taken along the line 7—7 of FIG. 4.
Figure 8:
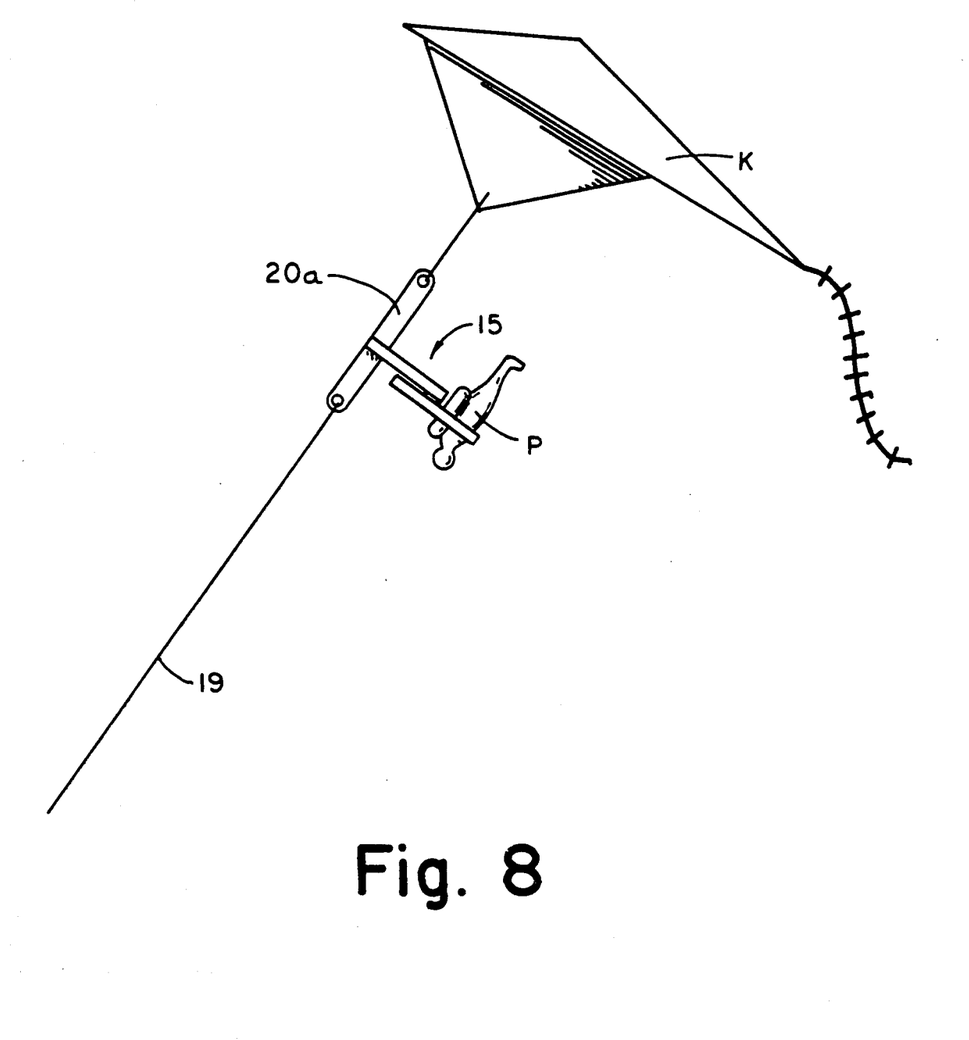
FIG. 8 is a perspective view of a modification of the present invention.

As shown in FIG. 6, in the preferred embodiment of the invention the end of jaw (2) is constructed as a clevis having sides (2a) and (2b) and aligned holes (10a) and (10b), respectively, which extend through the jaw (2). When the two jaws (1) and (2) are closed, locking pin hole (9) in jaw (1) is aligned with the holes (10a) and (10b) in jaw (2). In the preferred embodiment of the invention, the distance between the opposite facing sides of the clevis (2a) and (2b) is only slightly greater than the cross-sectional width of jaw (1). A gelatin capsule ("gel-cap") (11) inserted through holes (10a), (9) and (10b) locks the jaws (1) and (2) in the "closed" position.

In the preferred embodiment of the invention a bracket (12) extends from jaw (2) above the pivot pin (3). A string (14) inserted through a hole (13) in the bracket (12) is used to tie the release mechanism [generally designated (15) in the drawings] to a kite (K).

In the preferred embodiment of the invention the release mechanism (15) hangs beneath the kite (K). The release mechanism (15) is prevented from becoming entangled with the kite's guy string (19) by a spacer (16) which, in the preferred embodiment of the invention, comprises a hollow elongated tube (such as a drinking straw) which surrounds the guy string (19) and is held in place directly beneath the kite (K) by a washer (17) or similar device which, in turn, is held in place by a knot (18) in the guy string (19).

OPERATION

Figure 1:
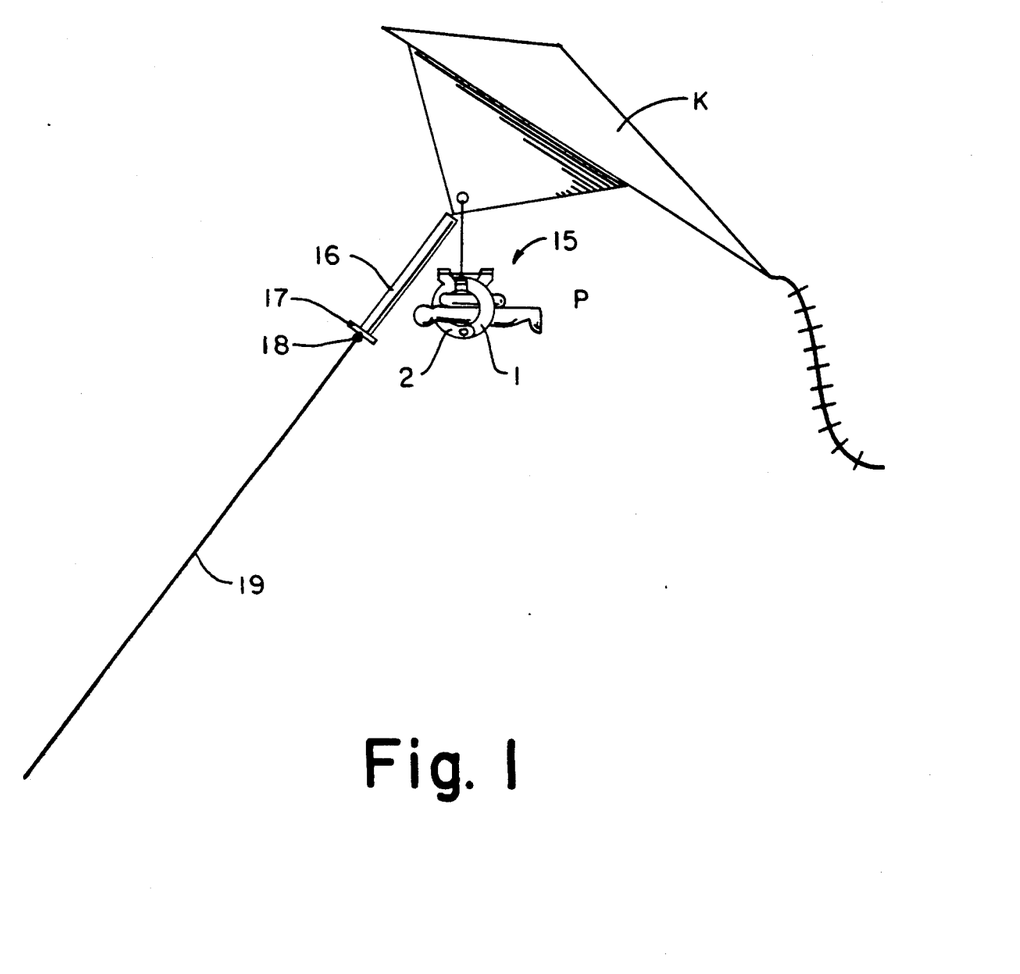
FIG. 1 is a perspective view showing the present invention attached to a kite, with the mechanism in the "closed" position and grasping a "paratrooper" toy.
Figure 2:
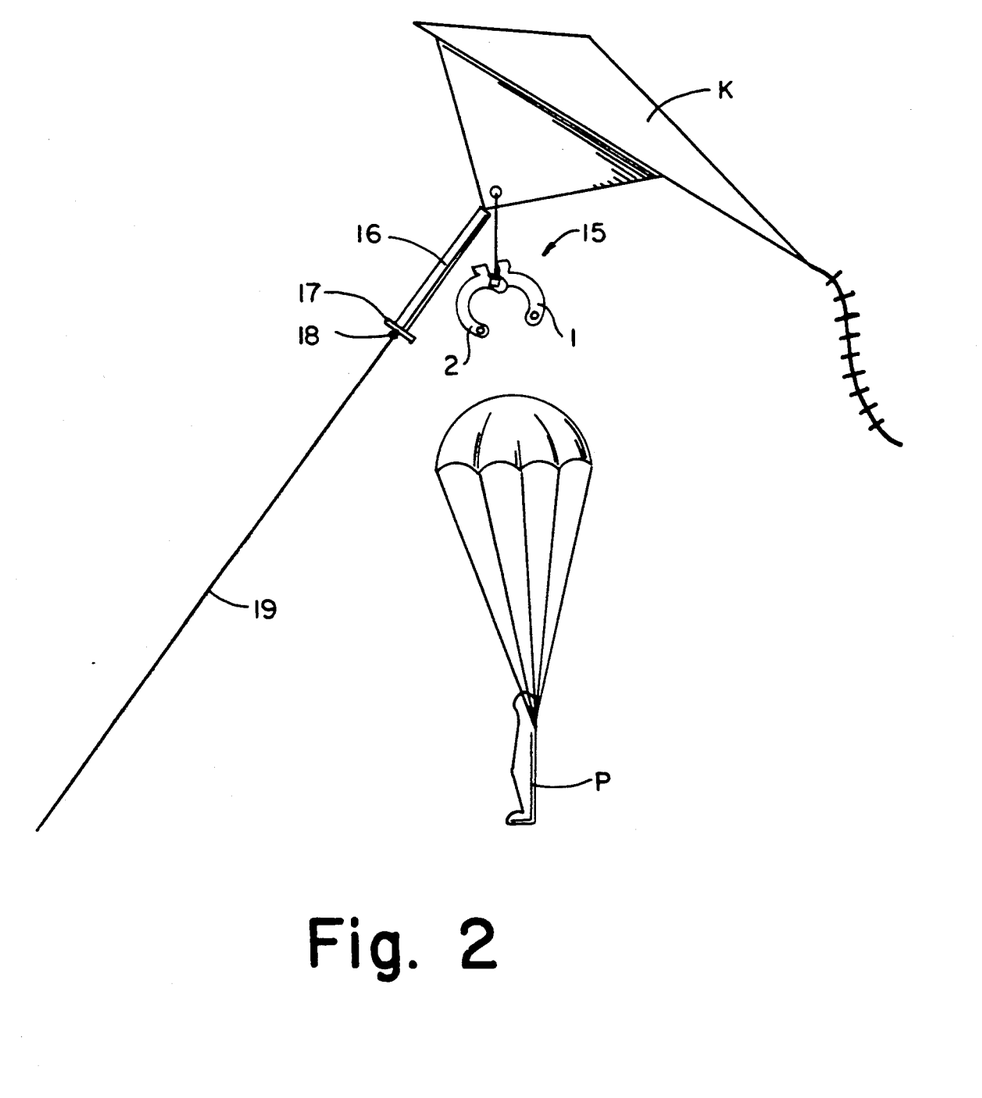
FIG. 2 is a perspective view showing the present invention attached to a kite, with the mechanism in the "open" position and the "paratrooper" load being released.

In the preferred embodiment of the invention a string (14) is inserted through a hole (13) in bracket (12) and the release mechanism (15) is tied securely to the underside of the kite (K) as shown in FIGS. 1 and 2. As shown in the figures, the bracket (12) extends perpendicular to the plane of the jaws (1) and (2), and the arms (4) and (5) extend away from the bracket (12), such that the arms (4) and (5) hold the rubber band (6) away from the string (14) which ties the device to the kite (K).

Rubber band (6) draws arms (4) and (5) toward each other, which tends to pull jaws (1) and (2) apart, as shown in FIG. 5. A toy "paratrooper" (P) is placed between the jaws (1) and (2). The jaws (1) and (2) are then manually pushed together until the locking pin holes (9), (10a) and (10b) in the jaws (1) and (2) are aligned as shown in FIG. 6. In the preferred embodiment of the invention the closed jaws (1) and (2) define an enclosed area (A) which is approximately the same size and shape as the cross-sectional area of the "paratrooper" (P).

After the paratrooper (P) is inserted between the closed jaws (1) and (2), a liquid-filled gel-cap (11) is inserted into pin holes (9), (10a) and (10b). The gel-cap (11) thus inserted serves as a locking pin and holds the two jaws (1) and (2) in the closed position.

In the preferred embodiment of the invention the gel-cap (11) is made of a soluble material such as is commonly used in time-release medicine capsules. The gel-cap (11) is constructed of two telescoping, separable parts (11a) and (11b). In the preferred embodiment of the invention the overall length of the gel-cap (11) is between 0.950 and 1.000 inches; the outside diameter is between 0.300 and 0.350 inches; and the wall thickness of the gel-cap is between 0.005 and 0.010 inches. However, any common size gel-cap will work, so long as the diameters of the holes (10a), and (10b) and (9) are sized to correspond to the diameter of the gel-cap selected.

Prior to inserting the gel-cap (11) into the holes (10a), (10b) and (9) of the jaws (1) and (2), the gel-cap (11) is at least partially filled with a liquid (16) which is capable of dissolving the gel-cap (11). In the preferred embodiment of the invention the liquid (16) is a mixture of water and salt. It has been found that a salt water solution of three salt tablets (10 grains each) to one teaspoon water is the preferred solution. Salt tablets are preferred to table salt, (although both work) because salt tablets dissolve completely in water while table salt does not completely dissolve under normal conditions. The higher the concentration of salt in the liquid (16), the sooner the gel-cap (11) dissolves.

After the liquid-filled gel-cap (100) is in place and the "paratrooper" (P) is clinched by the closed jaws (1) and (2), the kite (K) may then be flown, as shown in FIG. 1.

In the preferred embodiment of the invention the release mechanism (15) is tied to the bottom of the kite (K). However, it can be appreciated that the release mechanism could also be secured, either directly or indirectly, to the kite's guy string (19). When the release mechanism (15) is tied to the bottom of the kite (as shown in FIG. 1) it is useful to provide a rigid, or semi-rigid, spacer (16) at the top of the guy string so as to prevent the release mechanism (15) from becoming entangled in the guy string (19). Although a hollow plastic tube is used for the spacer (16) in the preferred embodiment of the invention, any other elongated member could also be used.

Figure 3:
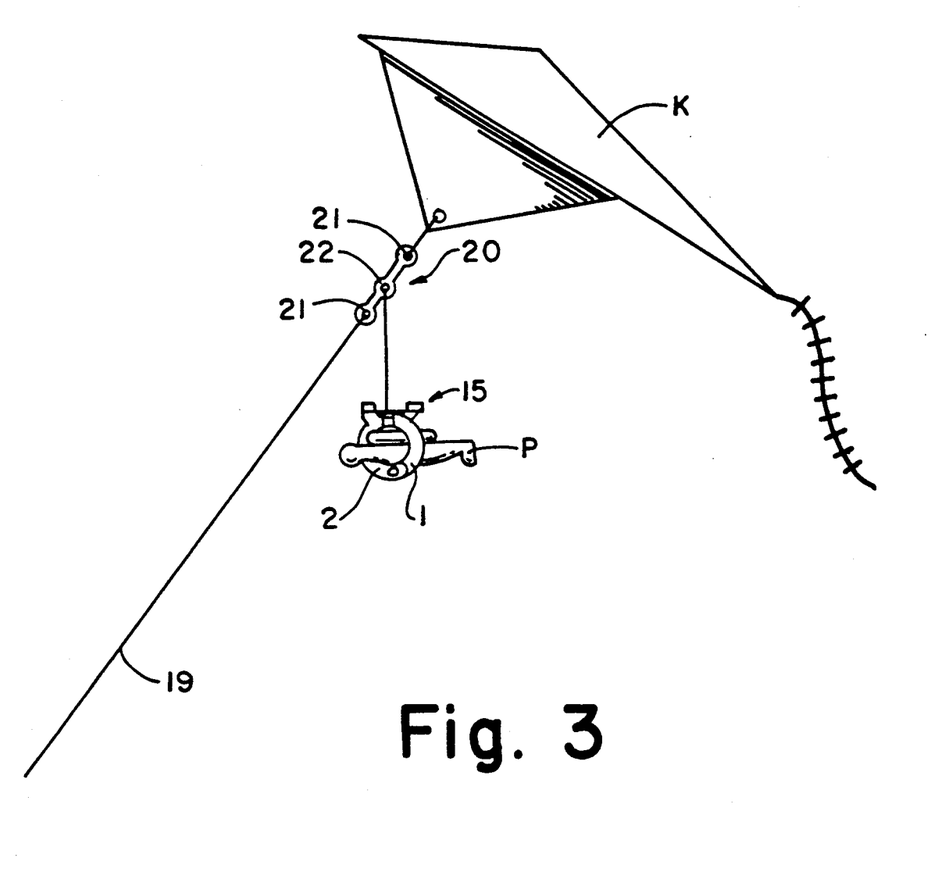
FIG. 3 is a perspective view of the present invention attached to a kite guy line.

The release mechanism (15) can alternatively be attached directly to the guy string (19), or indirectly as shown in FIG. 3. In FIG. 3 a guy link (20) is tied intermediately to the guy string (19). The guy link (20) can be constructed of any rigid or semi-rigid material. Holes (21) are provided in the end of the guy link (20) for conveniently tying the guy string (19) to the guy link (20). A hole (22) is also provided intermediately along the guy link (20) for conveniently tying the release mechanism (15) to the guy link (20). The guy link (20) helps prevent the release mechanism (15) from becoming entangled in the guy string (19).

The hole (13) in the bracket (12) is preferably a finite distance (nominally ¼" to ⅜") from the plane of the jaws (1) and (2). In addition to helping to keep the rubber band (6) from becoming entangled in the kite attachment string (14), this also causes the release mechanism (15) to hang at a tilted angle (i.e. the plane of the jaws (1) and (2) is not vertical) which, consequently, causes the axis of the gel-cap (11) to be tilted from horizontal. The tilting of the gel-cap (11) causes the liquid (16) in the gel-cap (11) to collect in one end of the gel-cap and under the (center) jaw (1). These factors contribute to the reliability and repeatability of the device.

Several minutes after the liquid-filled gel-cap (11) begins to dissolve, the gel-cap noticeably softens. When the gel-cap (11) becomes sufficiently soft, the jaws (1) and (2) pull away from each other (due to the force of the rubber band (6)), cutting the gel-cap (11), and opening the release mechanism (15) and thereby releasing the "paratrooper" toy (P). In the preferred embodiment of the invention three members, (namely: sides (2a) and (2b), and jaw (1)), hold the gel-cap in place prior to its (the gel-cap's) dissolving. This (three-member) construction was found preferable to two-member construction (e.g. two single-blade jaws), because the former construction forces the gel-cap (11) to dissolve to a higher degree before the jaws cut through the gel-cap (11) and releases the paratrooper, thus eliminating erratic results associated with the latter construction.

In the preferred embodiment of the invention the holes (10a) and (10b) are bevelled (as shown in FIG. 6) so as to cooperate with jaw (1) to produce a high shear force against the gel-cap (11). Once the gel-cap (11) has dissolved sufficiently, the center arm (i.e. jaw (1)) cuts through the gel-cap (11) and the "paratrooper" (P) is released.

It will be appreciated by those skilled in the art that the disclosed invention thus provides for the time-delayed release of a "paratrooper" toy (P) from an airborne kite (K).

Three methods of varying the amount of time delay are available to the operator. The amount of time delay before which the release mechanism opens can readily be increased by either reducing the salt concentration of the solution (16), reducing the strength of the rubber band (6), or increasing the thickness of the wall of the gel-capsule (11), or any combination thereof. Conversely, increasing the salt concentration, increasing the strength of the rubber band, and reducing the wall thickness of the gel-capsule will each reduce the time delay before which the release mechanism opens.

Figure 9:
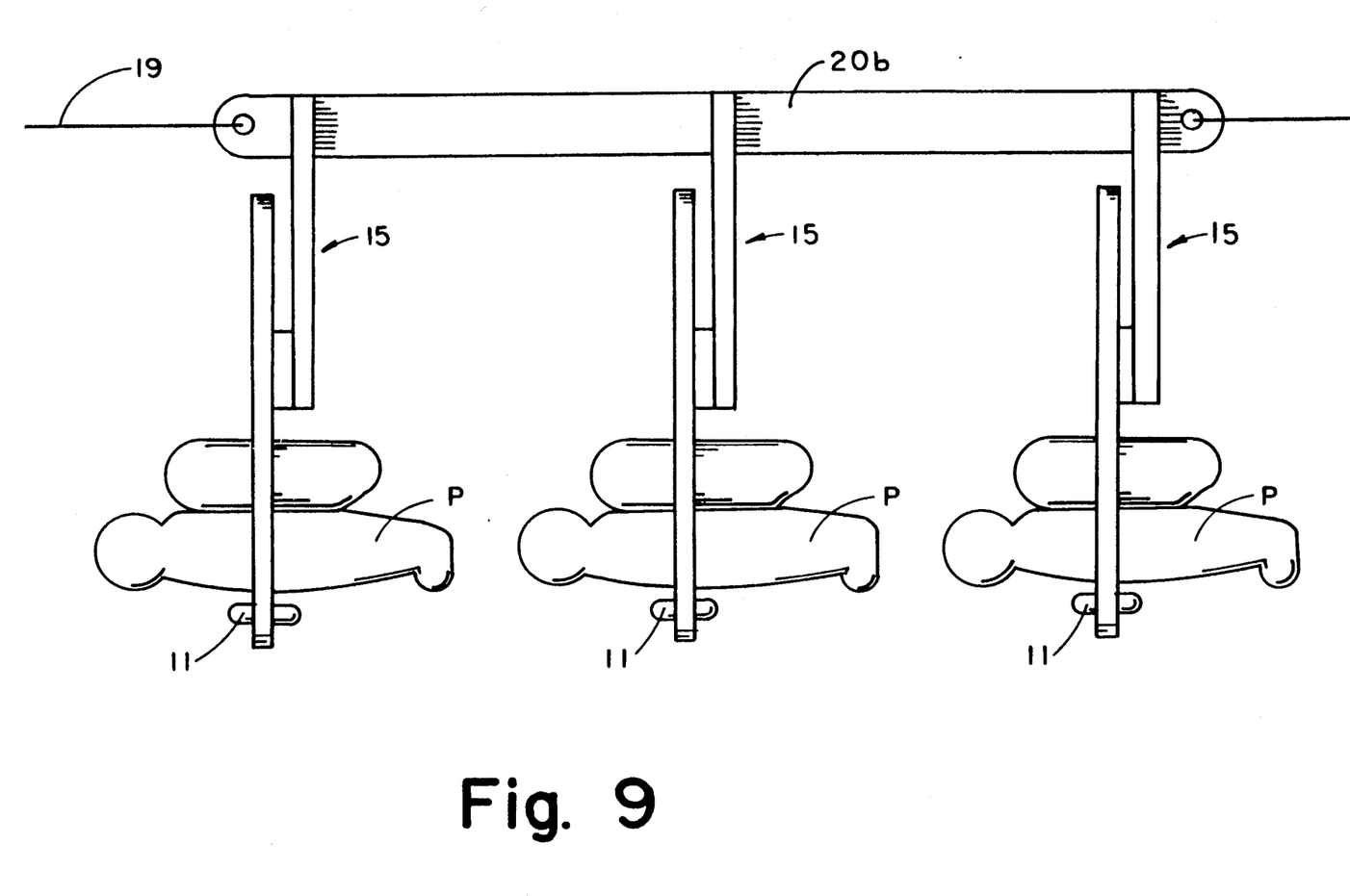
FIG. 9 is a perspective view of a FIG. 9 is a prespective view of a multiple-payload modification of the present invention.

A modification of the present invention having multiple payloads (P) and multiple release mechanisms (15) is shown in FIG. 9. It will be appreciated by those skilled in the art that by selecting the thickness of the rubber bands, the thickness of the wall of the gel-capsules, and the salt solutions' concentrations, the operator can thereby select the timing and the sequence of release of the multiple payloads (P) from the multiple release mechanisms (15) shown in FIG. 9.

While the above description contains many specificities, these should not be construed as limitations on the scope of the invention, but rather as an exemplification of one preferred embodiment thereof. Many other variations are possible, for example:

The clevis jaw construction (2a) and (2b) of jaw (2) shown in FIG. 6 could be replaced by a single-blade jaw such that the opposing jaws (1) and (2) simply work in a fashion similar to the operation of a pair of scissors;

The bracket (12) could be attached to either side of the release mechanism, (i.e. to either jaw (1) or (2));

Other devices, such as elastic or compression springs, could be used in place of the rubber band (6) to draw the arms (4) and (5) together;

Arms (4) and (5), respectively, could extend to the from the outboard side of pivot pin (3) so as to cause the jaws (1) and (2) to operate much like a pair of scissors, and a tension spring could then be used in place of the rubber band (6) to cause the jaws to pull apart;

The capsule (11) could be replaced with a non-gelatin capsule, so long as the liquid (16) (which could be other than salt water) in the capsule causes the selected capsule to dissolve;

The release mechanism (15) may be secured to the kite directly without the use of a spacer (16) or other device to keep the mechanism from becoming entangled in the kite string;

The "paratrooper" may be any device which the operator may elect to drop from the release mechanism;

The release mechanism disclosed herein may be used to release objects from airborne balloons, or airplanes rather than from a kite;

and other timing devices, such as spring or battery powered timers, may be used in place of the dissolving capsule timer described above.

Accordingly, the scope of the invention should be determined not by the embodiment illustrated, but by the appended claims and their legal equivalents.

I claim:

1. A device for releasably supporting a solid object from an airborne vehicle comprising:
    a pair of pivotally connected cooperating jaws;
    means for biasing said pair of jaws in an open position;
    means for temporarily holding said pair of jaws in a closed position;
        said means for temporarily holding said pair of jaws in a closed position comprising a dissolvable member;
    means for dissolving said dissolvable member; and
    means for attaching said device to said airborne vehicle.

2. The device according to claim 1 wherein said means for dissolving said dissolvable member comprises a liquid encapsulated by said dissolvable member.

3. The device according to claim 2 wherein said means for holding said pair of jaws in a closed position further comprises:
    a first opening in the first of said pair of jaws;
    a second opening in the second of said pair of jaws;
    and wherein said dissolvable member is disposed in said first opening and said second opening.

4. The device according to claim 3 wherein said first of said pair of jaws comprises a clevis opening into which said second of said pair of jaws is disposed when said pair of jaws is in the closed position.

5. The device according to claim 4 wherein said means for biasing said pair of jaws in an open position comprises a compression member in communication with said pair of jaws.

6. The device according to claim 5 wherein said means for attaching said device to said airborne vehicle comprises
    a bracket member, said bracket member being attached to one of said pair of jaws;
    a hole in said bracket member;
    and an elongated cord attached to said bracket member.

7. A device for releasably supporting a solid object from a kite attached to a guy line comprising:
    a pair of pivotally connected cooperating jaws;
    means for biasing said pair of jaws in an open position comprising a compression member in communication with said pair of jaws;
    means for temporarily holding said pair of jaws in a closed position;
        said means for temporarily holding said pair of jaws in a closed position comprising:
            a dissolvable member;
            a first opening in the first of said pair of jaws; and
            a second opening in the second of said pair of jaws;
            and wherein said dissolvable member is disposed in said first opening and said second opening;
    means for dissolving said dissolvable member; and
    means for attaching said device to said kite prior to said kite's becoming airborne comprising:
        a bracket member attached to one of said pair of jaws;
        a hole in said bracket member;
        and an elongaged cord attached to said bracket member and to said kite;
    and means for displacing said jaws from said guy line comprising an elongated member attached to said guy line;

wherein said means for dissolving said dissolvable member is encapsulated by said dissolvable member;

and wherein said first of said pair of jaws comprises a clevis opening into which said second of said pair of jaws is disposed when said pair of jaws is in the closed position.

8. A device for releasably supporting a payload from a kite comprising:
   a pair of pivotally connected cooperating jaws;
   means for temporarily holding said pair of jaws in a closed position;
   said jaws being adapted to hold said payload when said jaws are in said closed position;
   means for temporarily opening said pair of jaws;
   and means for attaching said device to said kite.

* * * * *